United States Patent [19]
McIver

[11] 3,747,000
[45] July 17, 1973

[54] METHOD AND APPARATUS FOR PROVIDING SEQUENTIAL TURN-ON AND TURN-OFF CONTROL SIGNALS FOR A CHOPPER

[75] Inventor: Donald A. McIver, McKeesport, Pa.
[73] Assignee: Westinghouse Electric Corporation, Pittsburgh, Pa.
[22] Filed: Dec. 17, 1971
[21] Appl. No.: 209,052

[52] U.S. Cl. .................. 328/75, 307/240, 307/269, 328/48, 328/72, 321/43
[51] Int. Cl. ........................................... H03k 17/00
[58] Field of Search ................... 307/220 R, 223 R, 307/240, 269, 293; 328/48, 49, 72–75; 321/43

[56] References Cited
UNITED STATES PATENTS

| | | | |
|---|---|---|---|
| 3,096,483 | 7/1963 | Ransom | 328/48 |
| 3,241,017 | 3/1966 | Madsen et al. | 328/48 X |
| 3,304,504 | 2/1967 | Horlander | 328/74 X |
| 3,539,926 | 11/1970 | Breikss | 328/48 X |
| 3,383,525 | 5/1968 | Arksey | 328/48 X |

Primary Examiner—Stanley D. Miller, Jr.
Attorney—F. H. Henson, Jack M. Arnold et al.

[57] ABSTRACT

A counter counts in response to provided timing signals, and a first plurality of gates respond to a first predetermined count for providing a turn-on signal for the chopper. A second plurality of gates respond to a second predetermined count to provide a signal manifestation indicative of the time interval during which the turn-off signal for the chopper may be provided. A comparator compares a status signal, indicative of the desired signal level of operation of the chopper, with a ramp wave. When the signal level of the ramp wave is substantially at the same signal level as the status signal a control signal is generated. The latter control signal is provided to the input of a shift register and in response to the timing signals, the control signal is shifted through the shift register. When the shift register stores a selected signal indication, the turn-off pulse for the chopper is provided. There are also included means for inhibiting the provision of the turn-on and turn-off signals in the event the chopper is not operating at selected performance levels.

14 Claims, 5 Drawing Figures

3,747,000

METHOD AND APPARATUS FOR PROVIDING SEQUENTIAL TURN-ON AND TURN-OFF CONTROL SIGNALS FOR A CHOPPER

CROSS REFERENCE TO RELATED REFERENCES

Reference is made to U.S. Pat. No. 3,530,503 entitled "Solid State Chopper For Controlling Load Current" by H. C. Appelo et al. which is assigned to the assignee of the present invention.

BACKGROUND OF THE INVENTION

As is known in the art, choppers are used to control the on and off times of motors. When the motor used in a particular system is the direct current type, for example a traction motor or the like, which is used to propel a vehicle, the chopper is operating in a high noise environment. It is necessary therefor that the respective turn-on and turn-off signals for the chopper must be substantially immune to the noise level, which for example may be generated by currents flowing through the traction motor which are on the order of 1,000 amps. In the prior art monostable multivibrators were used to provide the turn-on and the turn-off signals. The latter multivibrators are very sensitive to a noisy environment, and when operating in such environment may, in many instances, provide truncated pulses at their outputs. Another deficiency of monostable multivibrators, operational in the described environment, is that their output pulses may not occur at corresponding time intervals from one period to the next.

According to the teachings of the present invention a chopper control system and method is provided which is substantially immune to a noisy environment, and which provides turn-on and turn-off signals for the chopper, which signals occur during predetermined time intervals from one period to the next.

SUMMARY OF THE INVENTION

A chopper control system and method is disclosed for providing turn-on and turn-off signals for a chopper. There are means for providing timing signals, and a counter counts in response to the provision of the timing signals. The turn-on signal is provided in response to the counter reaching a first predetermined count, and in response to the counter reaching a second predetermined count, a signal manifestation indicative of the time interval during which the turn-off signal may be provided is manifested. There are also included means responsive to the signal manifestation and the provision of a predetermined number of the timing signals for providing the turn-off signal for the chopper.

DESCRIPTION OF THE PREFERRED EMBODIMENT

Figure 1:
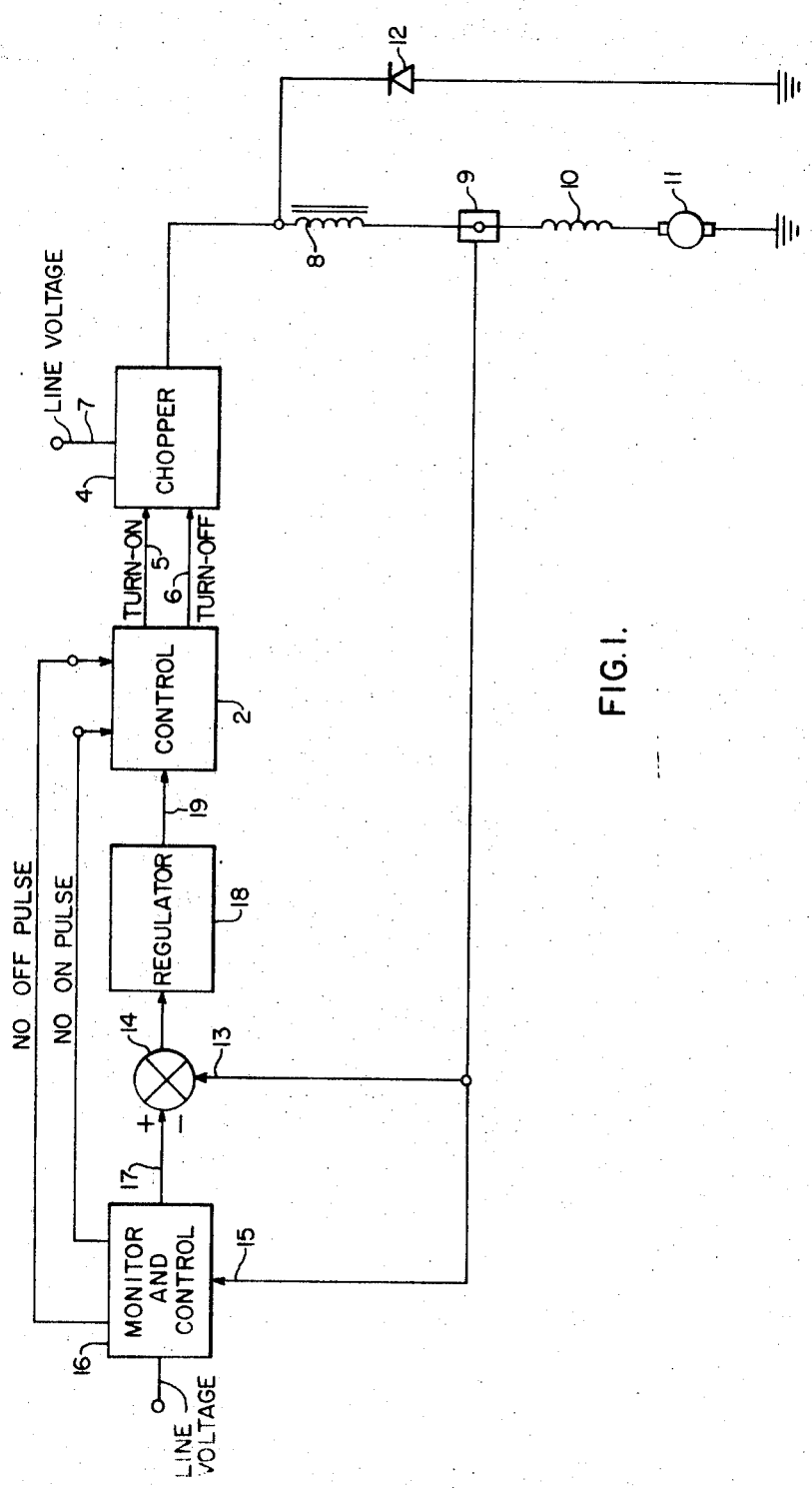
FIG. 1 is a schematic and block diagram representation of a motor control system embodying the teachings of the present invention.

In FIG. 1 there is generally shown a schematic and block diagram representation of a motor control system in which a chopper provides operating current to a motor in response to commands from a control device. A control device 2 provides a turn-on signal to a chopper 4 by way of a line 5, and provides a turn-off signal to the chopper 4 by way of a line 6. Line voltage is applied to the chopper 4 by way of line 7 from a voltage source (not of a Assume, for example, that the line voltage is a relatively high positive voltage. In response to a turn-on signal being applied to the chopper, the chopper applies a high value of current to the motor reactor 8 and the latter current flows through a transductor 9, a field winding 10, and through the motor 11. The motor 11 for example may be a direct current motor such as a traction motor or the like for providing the drive means for a vehicle which may be used in an automated vehicle control system. In response to a turn-off signal, the chopper 4 no longer provides current to the motor 11 and the magnetic fields about the reactor 8 and the field winding 10 collapse causing the free wheeling diode 12 to become conductive whereby current flows from ground through the reactor 8, the transductor 9, field 10 and the motor 11 causing the motor 11 to remain operative. The current drawn by the motor 11 is monitored to insure that the motor 11 is not drawing more or less current than is desired to maintain the motor 11 in an optium operating condition. The monitored signal is applied from the transductor 9 to a first input 13 of a summing point 14 and to an input 15 of a monitor and control device 16. The device 16 has applied to a second input the line voltage. The monitor and control device 16, for example, may be comprised of a plurality of gates and other logic elements for determining that the monitored signal is not above or below a desired signal level.

If on the one hand the motor 11 is drawing too much current, this is indicative of the chopper curcuit not operating at a first desired signal level of operation and a first chopper status signal is applied to the control unit 2 informing the unit that the chopper should not be turned on at this time whereby the current flowing through the motor 11 is decreased. This latter chopper status signal is termed the "no on pulse." On the other hand, if the motor 11 is drawing an insufficient amount of current indicating that the chopper is not operating at a second desired signal level of operation the monitor and control device 16 provides a second chopper status signal to the control device 2, and the control device 2 does not apply an off pulse to the chopper 4 whereby the chopper 4 continues to provide current to the motor 11. The latter chopper status signal is termed the "no off pulse." The monitor and control device 16 provides an output signal via a line 17 to a second input of the summing point 14. This latter input signal is proportional to a desired signal level of operation for the chopper unit 4. The summation of the inputs provided to the summing point 14 provides an output signal to a regulator 18. This latter output signal is indicative of whether the motor 11 is drawing a current which is substantially the same as the current which the motor 11 is actually suppose to be drawing at a given time. A regulator unit 18 responds to the output signal from the summing point 14 and in turn provides an output signal to the input of the control device 2 by way of a line 19. This latter signal is a signal indicative of the desired signal level of operation for the chopper unit 4 and the motor 11. The description of the function of this latter signal is to be described shortly in conjunction with the detailed description of the control device 2. As was previously mentioned, the control device 2 applies the "turn-on" and the "turn-off" pulses to the chopper device 4, for respectively turning the chopper on and off. It is to be appreciated that the chopper and motor circuit illustrated is one of many that may be controlled by the control device 2. For example, the chopper and motor circuit may take the form as illustrated in referenced U.S. Pat. No. 3,530,503.

Figure 2:
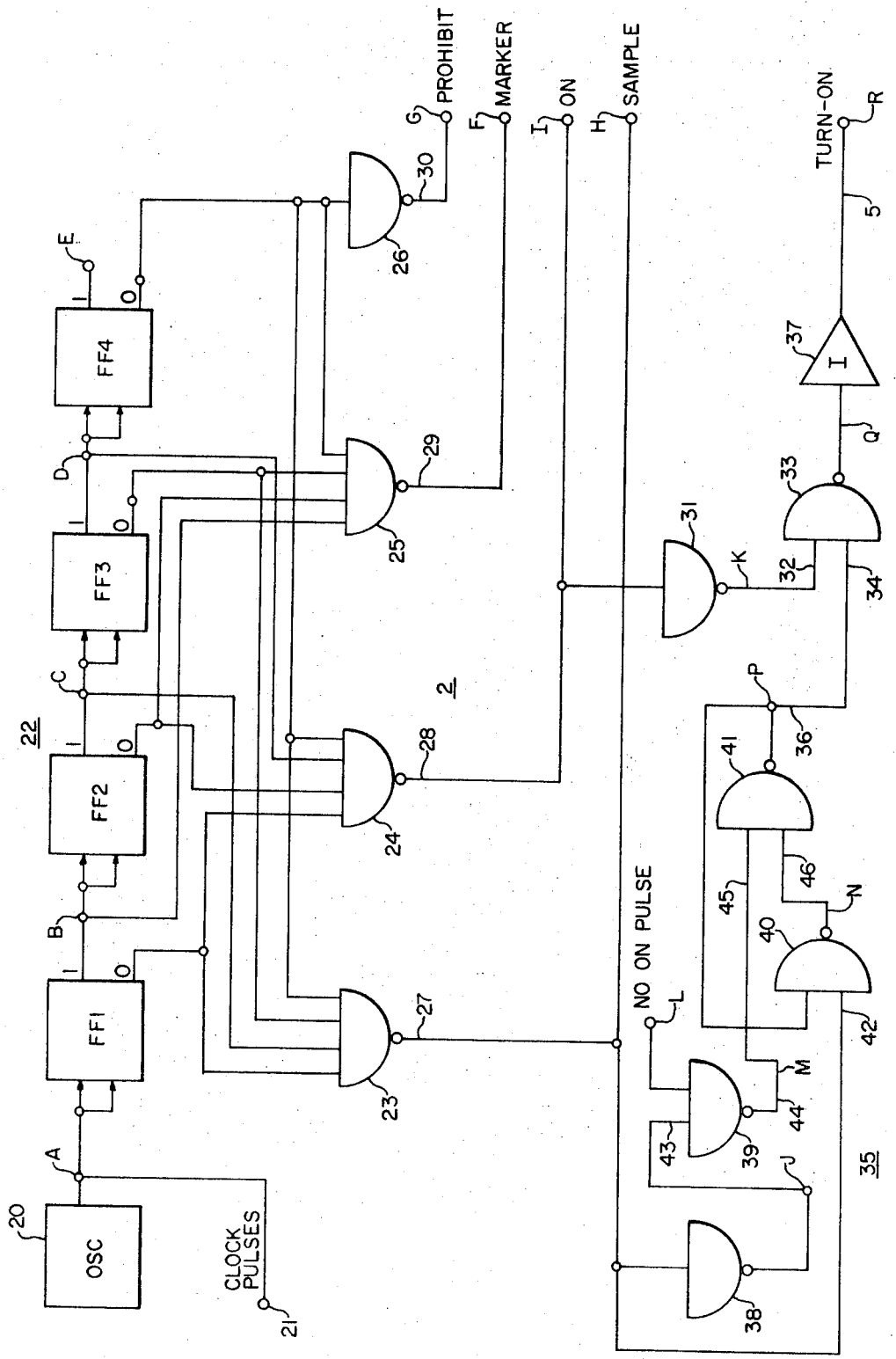
FIG. 2 is a block diagram representation of a part of the chopper control system embodying the teachings of the present invention.
Figure 3:
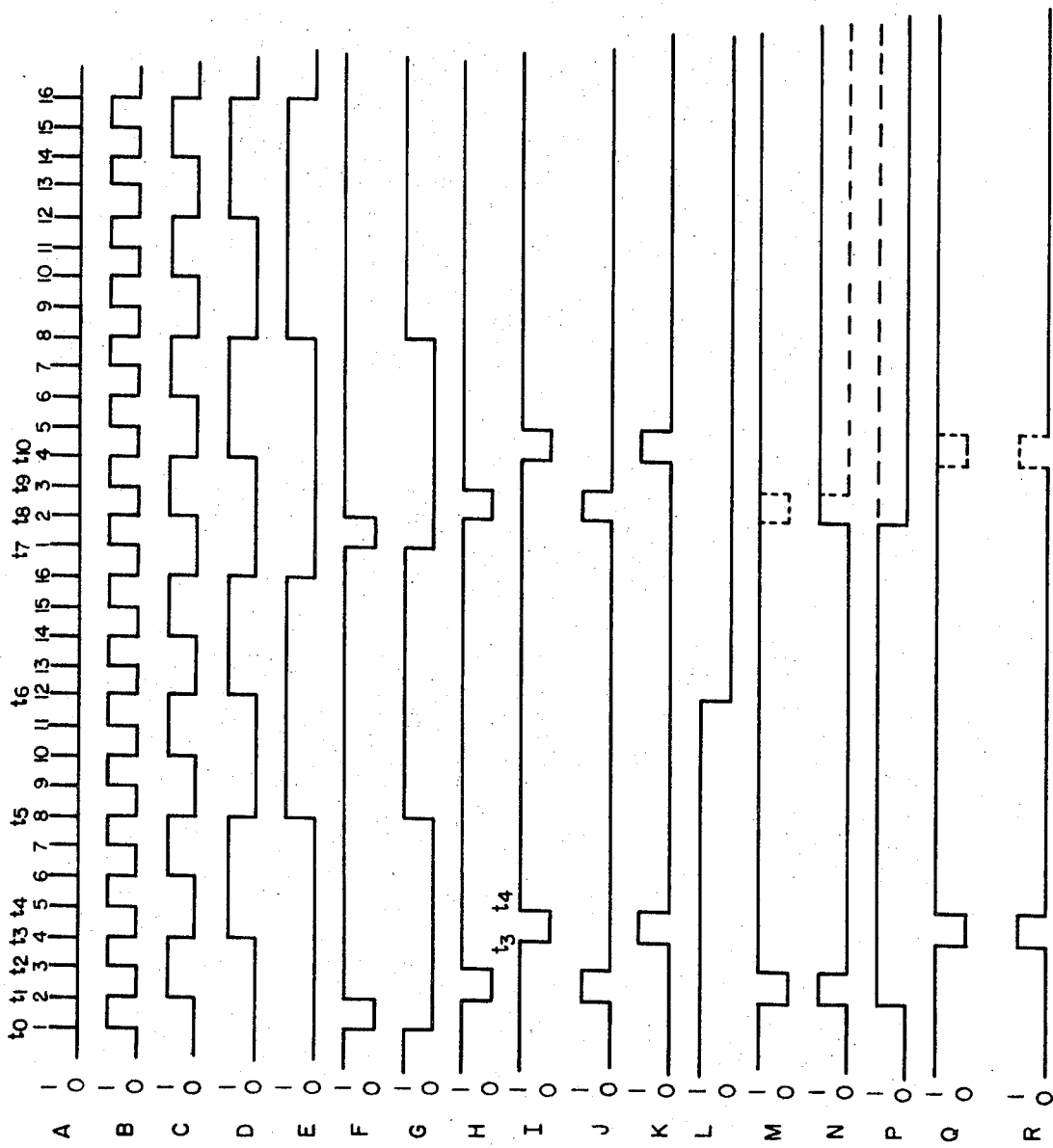
FIG. 3 is a wave form relationship diagram helpful in the understanding of FIG. 2.

In FIG. 2 there is illustrated a block diagram representation of the part of the control device 2 which generates the "turn-on" signal which is applied to the chopper 4. The letters A through R found on FIG. 2 are the circuit points at which the wave shapes A through R respectively of FIG. 3 are manifested in the circuit of FIG. 2. An oscillator 20 provides timing signals, for example clock pulses, to a terminal 21 and to the input of the first flip-flop stage FF1 of a serial counter 22. The oscillator 20 and the counter 22 provide the basic timing for the control unit 2, and in turn determine the "turn-on" and "turn-off" times for the chopper 4 which, as previously described, controls the amount of current drawn by the motor 11. A plurality of gates such as the gates 23 through 26 are connected in a predetermined manner to the respective 1 and 0 output terminals of the flip-flop stages FF1 through FF4 of the counter 22. It is to be appreciated that a greater or a lesser number of flip-flop stages may be utilized in the practice of the invention. Since the counter 22 is illustrated as a four-stage counter, 16 timing signals from the oscillator 20 (see wave-shape A of FIG. 3) are required for the counter 22 to complete one cycle of operation. One cycle of operation of the counter 22 in turn controls one cycle of operation of the chopper 4 and is termed the commutation time for the latter chopper. The plurality of gates 23 through 26 are NAND gates, as are all of the other gates illustrated in the accompanying drawings. The convention is adapted, for purposes of description, that a relatively positive voltage level is indicative of a binary 1 signal indication and a relatively negative voltage level is indicative of a binary 0 signal indication. The use of positive logic is also assumed, that is if one or more of the signals applied to the NAND gate is at a binary 0 level the output is at a binary 1 level. Only if all of the inputs to the NAND gate are at a binary 1 level, is a binary 0 signal provided at the output of the gate.

The NAND gate 23 has its inputs connected to the 0 output terminal of FF1, the 1 output terminal of FF2, the 0 output terminal of FF3, and the 0 output terminal of FF4, respectively. Therefore, the NAND gate 23 provides a binary 0 signal at its output terminal 27 only when the counter 22 is at a count of 2. The signal provided at the output terminal 27 of the gate 23 is termed the "sample" signal. The function of this latter signal is to be described shortly. The inputs of the NAND gate 24 are connected to the 0 output terminal of FF1, the 0 output terminal of FF2, the 1 output terminal of FF3, and the 0 terminal of FF4, respectively. The gate 24, therefore, provides a binary 0 signal at its output terminal 28 only when the counter 4 is at a count of 4. The signal provided at the output terminal 28 of the gate 24 is termed an "on" signal. The function of this signal is to be described shortly. The gate 25 has its inputs connected to the 1 output terminal of FF1, the 0 output terminal of FF2, and the 0 output terminal of FF3, and the 0 output terminal of FF4, respectively.. A binary 0 signal level, therefore, is provided at the output terminal of the gate 25 only when the counter 22 is at a count of 1. The output signal provided at the output terminal 29 of gate 25 is termed a "marker" signal. The function of this latter signal is to be described shortly. The gate 26 has its sole input terminal connected to the 0 output terminal of FF4. The gate 26 therefor provides a binary 0 signal level at its output terminal during the time interval the counter 22 counts from a count of 1 to a count of 8, and provides a binary 1 signal at its output terminal during the time interval the counter counts from a count of 8 to a count of 16. The output signal manifested at the terminal 30 of the gate 26 is termed a "prohibit" signal. The function of the prohibit signal is to be described shortly.

Consider now the logical operation performed by the control circuit 2, for generating the "turn-on" signal for turning on the chopper. The "on" signal (see wave-shape I of FIG. 3), as was previously described, is provided at the output terminal 28 of the gate 24 when the counter 22 reaches a count of 4. This occurs at the time t3, or in other words, when the fourth timing signal or clock pulse is applied to the input of the counter 22 (see wave-shape A of FIG. 3). The binary 0 signal provided at the output of the NAND gate 24 at this time is applied to the input of a NAND gate 31 which inverts the latter pulse and applies a binary 1 signal to a first input terminal 32 of a NAND gate 33. The signal applied to the second input terminal 34 of the gate 33 is from a sample circuit 35 which provides a binary 1 signal at its output terminal 36 when a first chopper status signal indicative of a first desired signal of level of operation is received from the monitor and control circuit 16 (see FIG. 1). This status signal as was previously mentioned is termed a "no on pulse." Assume for the moment that the sample circuit 35 is providing a binary 1 signal to the input terminal 34 of the gate 33 (see wave-shape P of FIG. 3). This occurs when the "no on pulse" is at a binary 1 level, as is to be described shortly. In response to the simultaneous presence of the two binary 1 signals at the respective inputs of the gate 33, a binary 0 signal is provided at the output terminal of the gate 33 (see wave-shape Q of FIG. 3) which in turn is applied to the input of an inverting amplifier 37. The amplifier 37 then applies a positive "turn-on" pulse to the chopper 4 of FIG. 1 (see wave-shape R of FIG. 3).

Consider now the operation of the sample circuit 35. This latter circuit is comprised of a plurality of NAND gates 38 through 41, respectively. At a time t1 a binary 0 signal is applied from the NAND gate 23 to the input of the gate 38 and to the first input 42 of the gate 40. As was previously explained, this signal is termed the "sample" signal (see wave-shape H of FIG. 3). This signal's function is to determine that the status signals from the monitor and control device 16 are at selected desired signal levels of operation such that the "turn-on" and "turn-off" pulses respectively may be provided. The NAND gate 38 inverts the provided binary 0 signal and a binary 1 signal is provided at its output terminal (see wave-shape J of FIG. 3), which in turn is applied to the first input terminal 43 of the gate 39. Assume that at this particular instance of time (t1) that the "no on pulse" signal is at a binary 1 signal level which is indicative of the chopper circuit providing a normal amount of current to the motor 11. Since at this time the two inputs of the gate 39 are each at a binary 1 signal level a binary 0 signal is provided at the output terminal 44 of the gate 43 (see wave-shape M of FIG. 3). This latter signal is then applied to a first input terminal 45 of the gate 41. The second input terminal 46 of the gate 41 is receiving at this time a binary 1 signal from the gate 40 (see wave-shape N of FIG. 3). The gate 41 in response to the binary 0 and binary 1 signals applied to its respective input terminals provides a binary 1 signal at its output terminal 36 (see wave-shape P of FIG. 3). In response to this binary 1 signal, the gate 33, as was previously explained provides the binary 0 signal at its output terminal and the inverting amplifier 37 in turn provides a positive going "turn-on" pulse to the shopper circuit 4.

Consider now the operation of the sample circuit 35 when the "no on pulse" is at a binary 0 level which is indicative that the chopper circuit 4 (see FIG. 1) is applying too much current to the motor 11 which is the system condition of not operating at the first desired signal level of operation. At a time t6 the "no on pulse" drops from the binary 1 signal level to the binary 0 signal level. The gate 39 is providing a binary 1 signal level at the output terminal 44 at this time since it is receiving a binary 0 signal level at the input terminal 43 (see wave-shape J of FIG. 3). At time t8 during the second cycle of operation of the counter 22, the "sample" pulse is once again provided (see wave-shape H of FIG. 3) and in response to the latter signal the NAND gate 38 provides a binary 1 signal to the input terminal 43 of the gate 39 (see wave-shape J of FIG. 3). This later pulse however, has no effect on the gate 39 since the other input to the gate ("no on pulse") is at a binary 0 level, as was described previously. During normal operation the gate 39 would normally provide a binary 0 pulse output at this time t8 which pulse is shown in phantom (see wave-shape M of FIG. 3). The binary 1 signal level provided at the output of gate 39 at this time is applied to the input terminal 45 of the gate 41 and in response thereto the gate 41 provides a binary 0 signal at its output terminal 36 (see wave-shape P of FIG. 3), which in turn disables the gate 33 from providing a binary 0 pulse to the amplifier 37 which inhibits the provision of the "turn-on" signal. Normally the gate 40 provides a binary 1 output signal from the time t8 to the time t9 and this signal is shown in phantom (see wave-shape N of FIG. 3). The gate 41 in response to this signal input normally provides a positive signal at its output terminal for the duration of the cyclic period due to the feedback from the gate 41 to the gate 40. This signal indication is shown in phantom (see wave-shape P of FIG. 3). Since the binary 0 signal from the gate 41 is applied to second input terminal 34 of the gate 33, the gate 33 is inhibited from providing a binary 0 pulse at its output terminal at the "on" time which occurs at time t10. The time t10 is the point in time at which the output pulse from the gate 33 normally switches to a binary 0 level, which is shown in phantom (see wave-shape Q of FIG. 3). In response to the binary 1 signal at the input of the inverting amplifier 37 a negative output signal is provided at the output of the amplifier 37, which is indicative of no "turn-on" signal being applied to the chopper 4. A pulse in phantom is shown where the "turn-on" pulse would normally occur if a positive going "no on pulse" had been applied to the gate 39 indicating that the chopper circuit 4 is applying the correct amount of current to the motor 11 (see wave-shape R of FIG. 3). It is seen, therefore, that the "turn-on" signal is provided at the "on " time in response to the "on" signal being at a binary 0 level concurrent with the "no on pulse" being at a binary 1 level during a given sample period.

Figure 4:
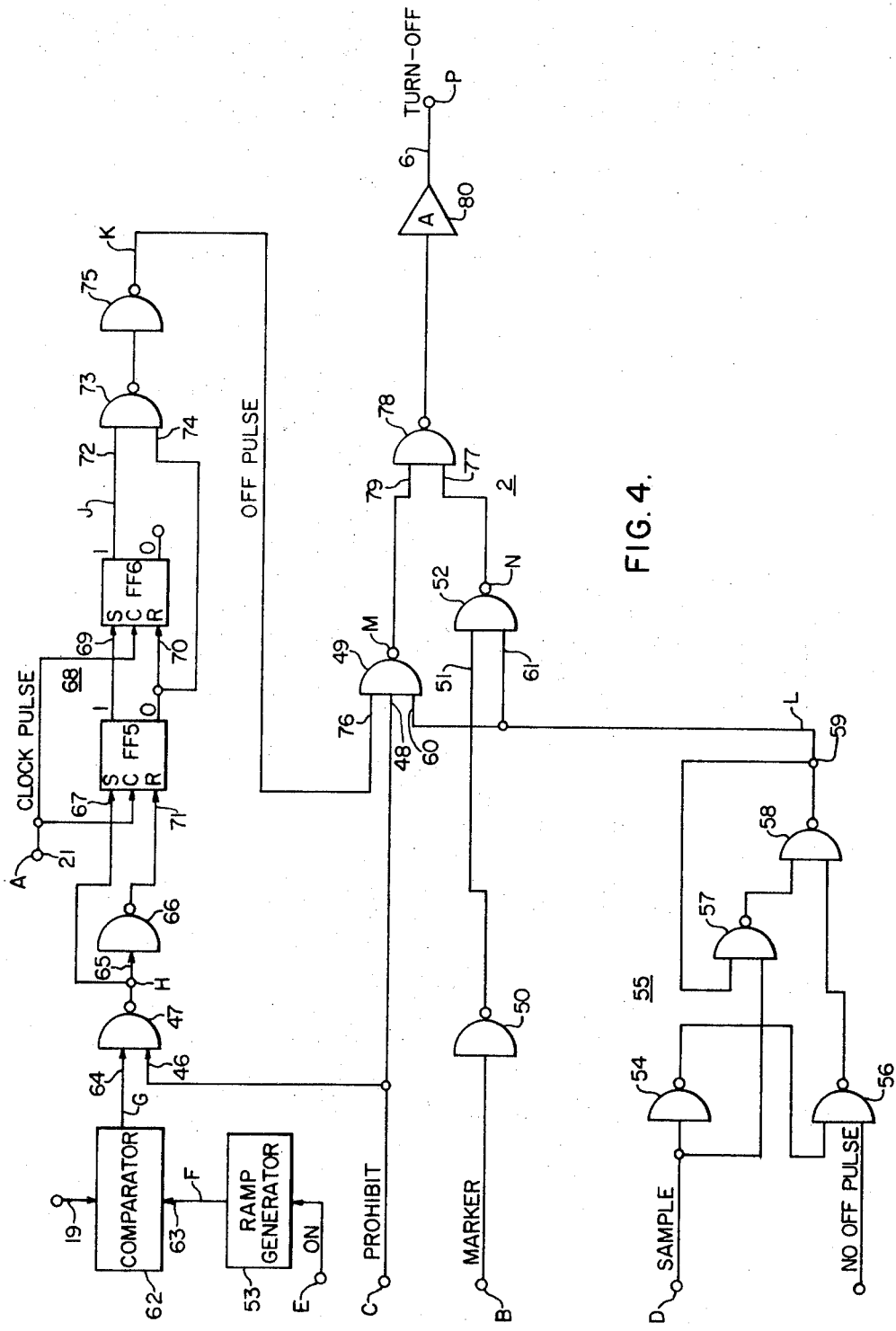
FIG. 4 is a block diagram of another part of the chopper control system embodying the teachings of the present invention.
Figure 5:
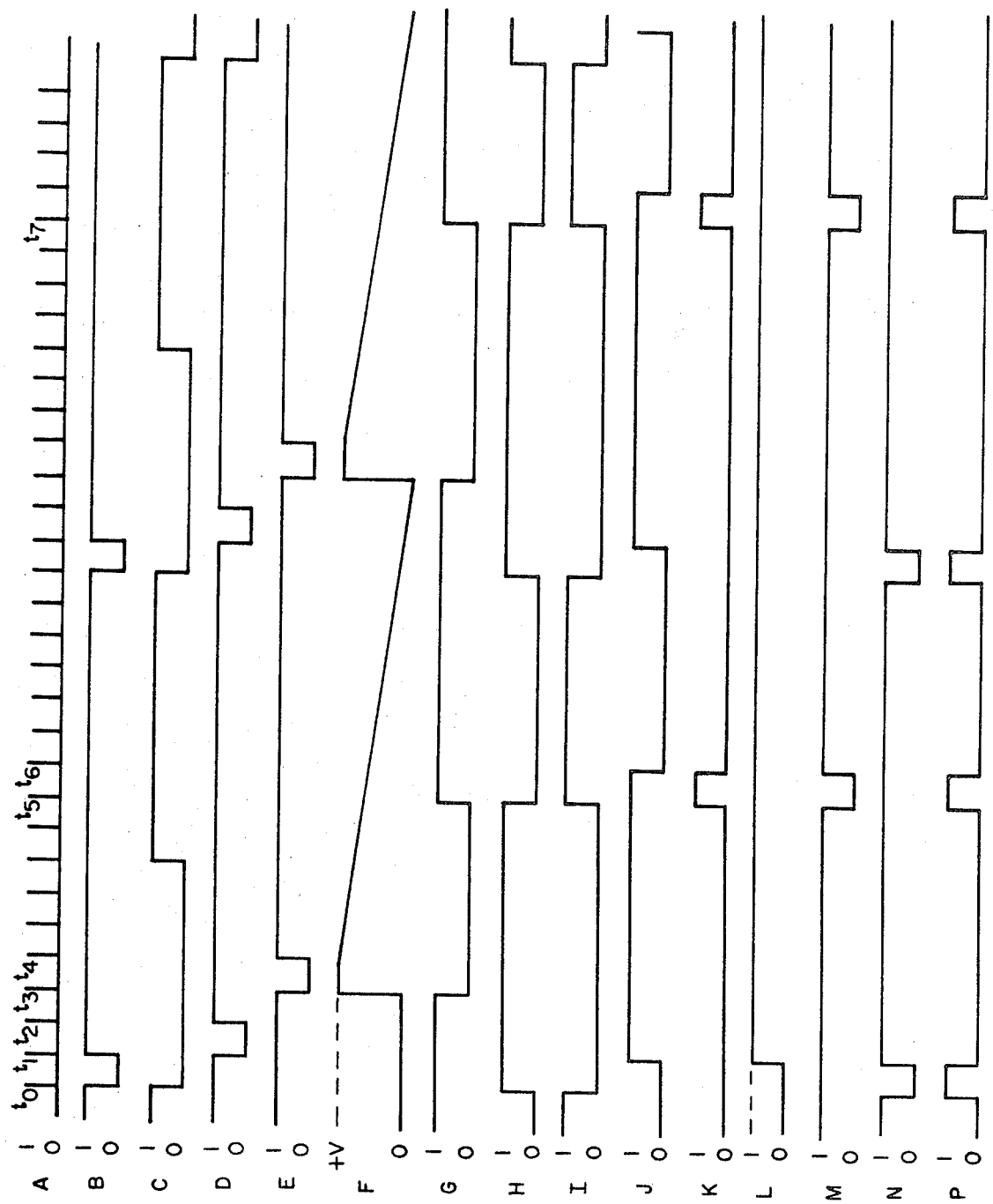
FIG. 5 is a wave form relationship diagram helpful in the understanding of the operation of the block diagram of FIG. 4.

Refer now to FIG. 4 which is a block diagram representation of the remaining part of the control circuit 2, which part provides the "turn-off" pulse for the chopper. The letters A through P found on FIG. 4 are the circuit points at which the wave-forms A through P, respectively of FIG. 5 are manifested in the circuit of FIG. 4. Consider now the logical operation of the circuit of FIG. 4 whereby the "turn-off" pulse is provided. The "turn-off" pulse is provided during an interval of time which is controlled by the "prohibit" signal which was generated in the circuit of FIG. 2 (see wave-shape C of FIG. 5). The "prohibit" signal is a signal manifestation indicative of the time interval during which the "turn-off" signal may be provided. The "prohibit" signal is applied to a first input 46 of a NAND gate 47, and to a first input 48 of a NAND gate 49. The functions performed by these respective NAND gates is to be described shortly. The "marker" pulse which is a pulse indicative of the beginning of each cycle of operation of the system is applied to the input of a NAND gate 50 (see wave-shape B of FIG. 5) and this binary 0 pulse which occurs in the time interval between times t0 and t1, which is the count of 1 of the counter 22 is then inverted by the gate 50 and applied to a first input 51 of a NAND gate 52. The function of this latter signal as used in the operation of the control circuit 2 is to be described shortly. The "on" signal which is generated in the circuit of FIG. 2 is applied to the input of a ramp generator 53 for resetting the ramp generator at the "on" time during each cyclic period of the system (see wave-shape E of FIG. 5). The "sample" signal is applied to the input of a NAND gate 54 and the first input of a NAND gate 57. The gates 54 and 57 form part of a sample circuit 55 which functions in the same manner as the sample circuit 35 of FIG. 2. The difference being that the input signal applied to the NAND gate 56 from the monitor and control circuit 16 is termed the "no off pulse" which is a second chopper status signal indicative of a second desired signal level of operation of the chopper. This latter signal is normally at a binary 1 level during the intervals of time when the chopper is supplying the normal or desired amount of current to the motor 11, and which latter signal is at a binary 0 signal level when the chopper is supplying an insufficient amount of current to the motor 11. The NAND gates 57 and 58 in the sample circuit 55 perform the same function as was performed by the gates 40 and 41, respectively in the sample circuit 35 of FIG. 2. Suffice it to say that when the "no off pulse" signal is at a binary 1 level, which is indicative of the system operating at a second desired level of operation, there is a binary 1 signal provided at the output terminal 59 of the sample circuit 55 which is applied to the second input terminals 60 and 61 of the NAND gates 49 and 52, respectively. Alternatively, when the "no off pulse" signal is at a binary 0 level, there is a binary 0 level signal provided at the output terminal 59. The operation of the sample circuit 55, therefor, is not to be described in detail as it operates in a manner similar to the sample circuit 35, the operation of which was previously described.

The comparator 62 receives at a first input 63 the ramp wave output from the ramp generator 53 (see wave-shape F of FIG. 5). A second input to the comparator 62 by way of a line 19 is a direct current level indicative of the desired signal level of operation of the system. This latter signal is derived from the regulator circuit 18 as illustrated in FIG. 1. When the ramp wave input to the comparator 62 is at substantially the same signal level as the signal input from the regulator 18 the comparator 62 provides a positive or binary 1 control signal output which is provided to a second input 64 of the gate 47 (see wave-shape G of FIG. 5). This latter control signal indication is indicative that a "turn-off" signal may be provided if the "prohibit" signal manifestation applied to the input terminal 46 of the gate 47 is also at a binary 1 signal level at this time. Assuming this is the case a negative or binary 0 control signal level is provided at the output of the gate 47. This latter control signal is then applied to the input 65 of a NAND gate 66 and to a first or set input 67 of a flip-flop FF5 which forms part of a storage or delay device such as a shift register 68. The remaining stage of the shift register 68 is a second flip-flop FF6 which has its first and second or set and reset inputs 69 and 70 respectively, connected to the 1 and 0 output terminals respectively of FF5. The clock terminals of FF5 and FF6 are connected to receive the clock pulses or timing signals from the oscillator 20 via the terminal 21 (see wave-shape A of FIG. 5). The second input or reset terminal 71 of FF5 is connected to the output of the NAND gate 66. The 1 output terminal of FF6 (see wave-shape J of FIG. 5) is connected to a first input terminal 72 of a NAND gate 73 and the second input terminal 74 of the latter gate is connected to the 0 output terminal of FF5 (see wave-shape I of FIG. 5). The gate 73 has its output connected to the input of a NAND gate 75, which in turn has its output connected to a third input 76 of the gate 49. The shift register 68 and the gates connected thereto in conjunction with the ramp generator 53 and the comparator 62 comprise a means which is responsive to the prohibit signal manifestation and a predetermined number of the timing signals or clock pulses, for providing a control signal output which in turn is used to generate the "turn-off" signal as will be described subsequently.

At time t0 a "marker" signal is provided as was previously explained, which signal starts the first cycle of operation of the system. The "marker" pulse which is at a binary 0 level (see wave-shape B of FIG. 5) is inverted by the NAND gate 50 and a binary 1 pulse is applied to the input terminal 51 of the NAND gate 52. The second input 61 of the NAND gate 52 is receiving a binary 1 level at this time from the sample circuit 55 (see wave-shape L of FIG. 5), as it is presumed that the system is operating at the second desired signal level of operation. In response to the latter signals, the NAND gate 52 provides a negative pulse to a first input 77 of a NAND gate 78 (see wave-shape N of FIG. 5). The second input 79 of the NAND gate 78 is also receiving a binary 1 level signal at this time (see wave-shape M of FIG. 5), since the "prohibit" signal (see wave-shape C of FIG. 5) is at a binary 0 level at this time irrespective of the signal levels applied to the input terminals 60 and 76. In response to the binary 0 signals applied to the terminals 77 and 79 respectively of the gate 78, a binary 1 signal or pulse is provided at the output of the NAND gate 78, which signal is provided to the input of a noninverting amplifier 79 which provides a "turn-off" signal at its output 6 only in response to a binary 1 or positive signal is generated at the "marker" time to insure that the chopper is ready for the next cycle of operation in the event an "off" signal has not been provided by the control logic illustrated in the upper portion of FIG. 4.

Consider now the operation of the latter control logic circuit. At time t0 the "prohibit" signal is at a binary 0 signal level and in response to the latter signal the gate 47 provides a binary 1 signal at its output (see wave-shape H of FIG. 5), irrespective of the binary signal level provided to the input 64 of the gate 47 from the comparator 62. The binary 1 signal level from the gate 47 continues at this level at least until the counter 22 (see FIG. 2) counts 8 of the applied timing signals, but in general at a time subsequent to the count of 8 and prior to a count of 16 dependent on the signal input to terminal 64 from the comparator 62. A positive or binary 1 signal output from the gate 47 is then applied to the input terminal 67 of FF5 and also to the input 65 of the NAND gate 66 which gate in turn provides a negative or binary 0 signal level to the second input 71 of FF5. In response to the clock pulse at time t1, FF5 is set to a binary 1 condition and the 0 output terminal of the latter flip-flop therefor is at a binary 0 signal level which is applied to the input terminal 74 of the NAND gate 73. The NAND gate 73 is considered to be disabled whenever one or both of the input terminals 72 or 74 are at a negative or binary 0 signal level. In response to the clock pulse at time t2, FF6 then switches to a binary 1 condition and FF5 remains in a binary 1 condition. The gate 73 therefor remains in a disabled condition due to the binary 0 signal level at its input terminal 74. The gate 75 responds to this binary 0 signal level and provides a binary 1 signal level (see wave-shape K of FIG. 5) to the input 76 of the gate 49. Since the "prohibit" signal is at a negative or binary 0 level at this time, the gate 49 provides a binary 1 signal to the terminal 79 of the gate 78. The gate 78 is receiving at its second input terminal 77 a binary 1 signal level at this time, and in response to the binary 1 signal inputs a negative or binary 0 level is provided to the input of the amplifier 79 and the noninverting amplifier provides a negative signal at its output 6 which is indicative of no "turn-off" signal being generated (see wave-shape P of FIG. 5). This condition persists until at least a system count of 8 as was previously described.

At the time t3 an "on" pulse is provided to the input of the ramp generator 53 (see wave-shape E of FIG. 5) and the ramp generator is reset providing a ramp wave at its output which begins to linearly decrease in amplitude in a negative direction (see wave-shape F of FIG. 5). As was explained previously, when the ramp wave reaches substantially the same signal level as the direct current level applied to the input 19 the comparator 62 provides a positive or binary 1 signal at its output until the "on" time in the next cycle. This, for example, occurs at the 10th clock pulse time t5. Since at this time the "prohibit" signal is also at a binary 1 signal level, the output of the gate 47 (see wave-shape H of FIG. 5)

switches to a negative or binary 0 signal level and the output of the gate 66 in response thereto switches to a binary 1 signal level. At this same clock pulse time t5, FF5 then is switched to a binary 0 condition and the 0 output terminal of FF5 switches to a positive or binary 1 signal level (see wave-shape I of FIG. 5). FF6 remains in a binary 1 condition at this time (see wave-shape J of FIG. 5). The gate 73 therefor is receiving binary 1 signal levels at its input terminals 72 and 74, respectively and in response thereto a negative or binary 0 pulse is provided which in turn is inverted by the NAND gate 75 and a binary 1 "off pulse" is provided to the input 76 of the gate 49 (see wave-shape K of FIG. 5). The signal input to the terminal 48 is at a binary 1 signal level at this time since the "prohibit" signal is at this level (see wave-shape C of FIG. 5). The input 60 (see wave-shape L of FIG. 5) is also at a binary 1 signal level at this time since the chopper 4 is providing the correct amount of current to the motor 11. Since all of the signal inputs to the gate 49 are now at a binary 1 signal level, a binary 0 pulse is provided at the output of the gate 49 during time interval t5 to t6. This binary 0 pulse is applied to the terminal 79 of the gate 78. Since the input 77 of the gate 78 is now at a binary 1 signal level, the gate 78 provides a binary 1 signal at its output which is amplified by the amplfiier 80. The amplifier 80 then provides a positive "turn-off" pulse at its output 6 for application to the chopper 4 for interrupting the application of current from the chopper 4 to the motor 11. The 11th clock pulse at time t6 sets FF6 to the binary 0 condition whereby the 1 output terminal of the latter flip-flop switches to a binary 0 signal level (see wave-shape J of FIG. 5). This binary 0 signal level disables the gate 73 as was previously explained. An "off" pulse is not generated again until time t1 when a marker pulse is provided, as was previously explained.

It is seen therefor that the shift register 68 delays the provision of an "off-pulse" in response to the provision of a predetermined number of timing signals. For the embodiment illustrated the delay is for two clock pulse times subsequent to the comparator 62 sensing like signal levels at its input concurrent with the "prohibit" signal being at a binary 1 signal level which is indicative that an off pulse may be generated during this time period. It is to be appreciated that the shift register 68 may comprise a greater number of stages whereby the "off-pulse" may be delayed for a greater amount of time. It is seen at a time t7 which is the 12th clock pulse time of the second cycle of operation that an "off-pulse" is once again generated. This occurs two clock times later than the time the "off-pulse" was generated during the first cycle of operation. This is due to the fact that the comparator 62 does not sense a comparison until clock time 12. It is seen therefore that the "off-pulse" is provided during the time the "probibit" signal is at a binary 1 signal level and when during this time interval a predetermined number of timing signals, for the example shown 2, are provided to the shift register 68.

In summary "turn-on" and "turn-off" pulses are provided to a chopper circuit from a control circuit which logically determines the times during which the latter "turn-on" and "turn-off" pulses are provided to, for example, the ON and OFF thyristors of the chopper. The latter pulses are provided at precise intervals of time and are substantially immune to environmental noise.

I claim:

1. In a chopper control system for providing first and second control signals for turning said chopper on and off; the combination comprising:
    means for providing timing signals;
    a counter which counts in response to the provision of said timing signals;
    means responsive to said counter counting to a first predetermined count for providing said first control signal;
    means responsive to said counter counting to a second predetermined count for providing a third signal having a duration indicative of the time interval during which said second control signal may be provided; and
    means responsive to the provision of said third signal and the provision of a predetermined number of said timing signals for providing said second control signal.

2. In a chopper control system for providing a turn-on signal and a turn-off signal for controlling the operation of a chopper; the combination comprising:
    first means for providing timing signals;
    a counter which counts in response to the provision of said timing signals;
    second means responsive to said counter counting to a first predetermined count for providing said turn-on signal;
    third means responsive to said counter counting to a second predetermined count for providing a count signal having a duration indicative of the time interval during which said turn-off signal may be provided; and
    fourth means responsive to the provision of said count signal and the provision of a predetermined number of said timing signals for providing said turn-off signal.

3. The combination claimed in claim 2 wherein said fourth means comprises:
    a comparator responsive to a provided first signal indicative of a desired signal level of operation of said chopper and a provided ramp wave which tranverses between first and second signal levels, said comparator providing an output signal in response to said ramp wave reaching a signal level substantially equal to the level of said provided first signal;
    fifth means responsive to the output signal from said comparator during the time said count signal is provided for providing a first control signal;
    storage means operable in response to said first control signal and said timing signals; and
    sixth means for providing said turn-off signal in response to said storage means storing a predetermined signal indication.

4. The combination claimed in claim 3, including means for inhibiting the provision of said turn-on signal in the event said chopper is not operating at a first desired signal level.

5. The combination claimed in claim 4, including means for inhibiting the provision of said turn-off signal in the event said chopper is not operating at a second desired signal level.

6. In a chopper control circuit for providing a turn-on signal and a turn-off signal for controlling the operation of a chopper, the combination comprising:
    means for providing timing signals;

a counter which counts in response to the provision of said timing signals;

means responsive to said counter reaching a first predetermined count for providing a marker signal indicative of the start of the chopper cycle of operation;

means responsive to said counter reaching a second predetermined count for providing a prohibit signal indicative of the time period during which said turn-off signal may be provided;

means responsive to said counter reaching a third predetermined count for providing said turn-on signal;

a comparator responsive to a provided first signal indicative of a desired signal level of operation of said chopper and a provided ramp wave which traverses between first and second signal levels, said comparator providing an output signal in response to said ramp wave reaching a signal level substantially equal to the level of said provided first signal;

means responsive to the provision of the output signal of said comparator and said prohibit signal for providing a first control signal;

storage means operable in response to the provision of said first control signal and said timing signals;

means for providing an off signal in response to said storage means storing a predetermined signal indication; and means responsive to the provision of one of said marker signal and said off signal for providing said turn-off signal.

7. The combination claimed in claim 6, including means responsive to said counter counting to a fourth predetermined count for providing a sample signal indicative of the time interval during which the operational status of said chopper is monitored.

8. The combination claimed in claim 7, including means for inhibiting the provision of said turn-on signal in response to a provided first chopper status signal concurrent with the provision of said sample signal.

9. The combination claimed in claim 8, including means for inhibiting the provision of said turn-off signal in response to a provided second chopper status signal concurrent with the provision of said sample signal.

10. In a chopper control system for providing a turn-on signal and a turn-off signal for controlling the operation of a chopper, the combination comprising:

means for providing timing signals;

a counter which counts in response to the provision of said timing signals;

means responsive to said counter reaching a first predetermined count for providing a marker signal indicative of the start of the chopper cycle of operation;

means responsive to said counter reaching a second predetermined count for providing a prohibit signal indicative of the time period during which said turn-off signal may be provided;

means responsive to said counter reaching a third predetermined count for providing a sample signal indicative of the time interval during which the operational status of said chopper is monitored;

means responsive to said counter reaching a fourth predetermined count for providing an on signal indicative of the time said turn-on signal may be provided;

means for providing said turn-on signal in response to the provision of said on signal;

means for inhibiting the provision of said turn-on signal in response to a provided first chopper status signal concurrent with the provision of said sample signal;

a comparator responsive to a provided first signal indicative of a desired signal level of operation of said chopper and a provided ramp wave which traverses between first and second signal levels,--said comparator providing an output signal in response to said ramp wave reaching a signal level substantially equal to level of said provided first signal;

means responsive to the provision of the output signal of said comparator and said prohibit signal for providing a first control signal;

storage means operable in response to the provision of said first control signal and said timing signals;

means for providing an off signal in response to said storage means storing a predetermined signal indication;

means responsive to the provision of one of said marker signal and said off signal during the time said prohibit signal is provided for provising said turn-off signal; and means for inhibiting the provision of said turn-off signal in response to a provided second chopper status signal concurrent with the provision of said sample signal.

11. A method of controlling the turn-on and turn-off times of a chopper, said method comprising the steps of:

providing timing signals;

providing a turn-on signal for said chopper in response to counting a first predetermined number of said timing signals;

providing a count signal indicative of the time interval during which a turn-off signal for said chopper may be provided in response to counting a second predetermined number of said timing signals; and providing said turn-off signal for said chopper in response to the provision of a predetermined number of said timing signals during the time said count signal is provided.

12. The method of claim 11 wherein said last-named step include the steps of:

comparing a provided first signal indicative of a desired signal level of operation of said chopper with a provided ramp wave which traverses between first and second signal levels, for providing a first control signal in response to said ramp wave reaching a signal level substantially equal to the signal level of said provided first signal;

providing a second control signal in response to the provision of said first control signal during the interval of time said count signal is provided; and providing said turn-off signal in response to the provision of a predetermined number of said timing signals following the provision of said second control signal.

13. The method of claim 12 including the step of inhibiting the provision of said turn-on signal in the event said chopper is not operating at a first desired signal level.

14. The method of claim 13 including the step of inhibiting the provision of said turn-off signal in the event said chopper is not operating at a first desired signal level.

* * * * *